United States Patent [19]

Ando et al.

[11] Patent Number: 5,322,890
[45] Date of Patent: Jun. 21, 1994

[54] ROOM TEMPERATURE CROSS-LINKAGE AQUEOUS COMPOSITION

[75] Inventors: Naotami Ando, Hyogo; Toshiyuki Masuda, Takasago; Takanori Hatano, Akashi, all of Japan

[73] Assignee: Kanegafuchi Kagaku Kogyo Kabushiki Kaisha, Osaka, Japan

[21] Appl. No.: 145,530

[22] Filed: Nov. 4, 1993

[51] Int. Cl.$^5$ .............................................. C08Z 43/04
[52] U.S. Cl. .................................... 524/806; 524/547
[58] Field of Search ....................... 524/806, 547, 457

[56] References Cited

U.S. PATENT DOCUMENTS 5,258,443 11/1993 Nield et al. ...................... 524/501

*Primary Examiner*—Joseph L. Schofer
*Assistant Examiner*—Jeffrey T. Smith
*Attorney, Agent, or Firm*—Varndell Legal Group

[57] ABSTRACT

A room temperature cross-linkable aqueous composition which contains an emulsion-polymerized copolymer comprising (I) a reaction product prepared by reacting (A) a monomer having at least one polymerizable double bond and a silyl group represented by the general formula (I):

$$X_{3-a}-\underset{\underset{\displaystyle |}{R^1_a}}{Si}- \quad (I)$$

wherein $R^1$: monovalent hydrocarbon selected from the group consisting of $C_{1-10}$ alkyl, aryl and aralkyl, X: a halogen, alkoxy, hydroxyl, acyloxy, aminoxy, phenoxy, thioalkoxy, or amino, a: 0, 1 or 2, and (B) a basic compound; and (II) a vinyl monomer copolymerizable with said (I) reaction product, and a process for preparing the same. The composition of the present invention has excellent storage stability and excellent room temperature cross-linkability which can be polymerized in stable condition without gelation.

3 Claims, No Drawings

ROOM TEMPERATURE CROSS-LINKAGE AQUEOUS COMPOSITION

BACKGROUND OF THE INVENTION

The present invention relates to a novel room temperature cross-linkable aqueous composition and a process for preparing the same, and more particularly to a novel room temperature cross-linkable aqueous composition which can give excellent film properties to materials for which weatherability, durability and the like are required, such as outer walls of buildings, automobiles and household electric appliances, and a process for preparing the same.

In recent years, there have been made some attempts to replace paints and adhesive agents containing an organic solvent with those containing an aqueous solvent from the viewpoint of preventing environmental pollution and saving resources.

Conventional paints and adhesive agents containing an aqueous solvent are, however, remarkably inferior in formed film properties such as weatherability, water resistance and stain resistance to those containing an organic solvent by the following reason. A water-disperible resin is generally used in conventional paints and adhesive agents. The water-disperible resin is prepared by emulsion-polymerization using an ionic or nonionic surfactant. Therefore, the water-disperible resin dose not have a crosslinkable functional group in its molecule and is easily influenced by the surfactant.

Various attempts to solve the above-mentioned defects have been proposed. One of the attempts is using a copolymer which is obtained by emulsion-copolymerizing a vinyl monomer having a hydrolyzable silyl group with other copolymerizable vinyl monomer to improve water resistance and weatherability of a polymer obtained by the emulsion polymerization using an ionic or nonionic surfactant (Japanese Unexamined Patent Publication No. 254116/1988).

However, since the copolymer has trimethoxysilyl group or triacetoxysilyl group as a hydrolyzable silyl group, the copolymer has defects that the copolymer is apt to gelate during preparing an emulsion or being stored and cannot stably be prepared and stored.

An object of the present invention is to provide an aqueous composition having excellent storage stability and excellent room temperature cross-linkability which can be polymerized in stable condition without gelation.

This and the other objects of the present invention will become apparent from the descriptions hereinafter.

SUMMARY OF THE INVENTION

In accordance with the present invention, there is provided a room temperature cross-linkable aqueous composition which contains an emulsion-polymerized copolymer comprising
(I) a reaction product prepared by reacting
   (A) a monomer having at least one polymerizable double bond and a silyl group represented by the general formula (I):

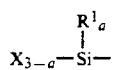

wherein $R^1$ is a monovalent hydrocarbon group selected from the group consisting of alkyl group having 1 to 10 carbon atoms, aryl group and aralkyl group, X is a halogen atom, alkoxy group, hydroxyl group, acyloxy group, aminoxy group, phenoxy group, thioalkoxy group or amino group, a is 0, 1 or 2, when the number of each of X and $R^1$ which is bonded to the Si atom is 2 or more, those X and $R^1$ may be either the same groups or the different groups respectively, and
   (B) a basic compound; and
(II) a vinyl monomer copolymerizable with said (I) reaction product.

Also, there is provided a process for preparing a room temperature cross-linkable aqueous composition comprising the steps of: emulsion-polymerizing
(I) a reaction product prepared by reacting
   (A) a monomer having at least one polymerizable double bond and a silyl group represented by the general formula (I):

wherein $R^1$ is a monovalent hydrocarbon group selected from the group consisting of alkyl group having 1 to 10 carbon atoms, aryl group and aralkyl group, X is a halogen atom, alkoxy group, hydroxyl group, acyloxy group, aminoxy group, phenoxy group, thioalkoxy group or amino group, a is 0, 1 or 2, when the number of each of X and $R^1$ which is bonded to the Si atom is 2 or more, those X and $R^1$ may be either the same groups or the different groups respectively, and
   (B) a basic compound; and
(II) a vinyl monomer copolymerizable with said (I) reaction product
in the presence of water at a temperature of at most 70° C. in the pH range 5 to 10.

DETAILED DESCRIPTION

As mentioned above, the room temperature cross-linkable aqueous composition of the present invention contains an emulsion-polymerized copolymer comprising
(I) a reaction product prepared by reacting
   (A) a monomer having at least one polymerizable double bond and a silyl group represented by the general formula (I):

wherein $R^1$ is a monovalent hydrocarbon group selected from the group consisting of alkyl group having 1 to 10 carbon atoms, aryl group and aralkyl group, X is a halogen atom, alkoxy group, hydroxyl group, acyloxy group, aminoxy group, phenoxy group, thioalkoxy group or amino group, a is 0, 1 or 2, when the number of each of X and $R^1$ which is bonded to the Si atom is 2 or more, those X and $R^1$ may be either the same groups or the different groups respectively, and
   (B) a basic compound; and
(II) a vinyl monomer copolymerzable with said (I) reaction product.

Typical examples of the above-mentioned X are, for instance, a halogen atom such as chlorine, bromine, alkoxy group having 1 to 16 carbon atoms, hydroxyl group, acyloxy group having 1 to 6 carbon atoms, aminoxy group, phenoxy group, thioalkoxy group having 1 to 16 carbon atoms and amino group.

Typical examples of the above-mentioned monomer (A) are, for instance, a compound represented by the general formula (II):

$$CH_2=\underset{\underset{R^2}{|}}{C}-\underset{\underset{R_a^1}{|}}{Si}-X_{3-a}^1 \quad (II)$$

wherein $R^1$ and a are as defined above, $R^2$ is hydrogen atom or methyl group, $X^1$ is a halogen atom, such as $$CH_2=CHSiCl_3, \quad CH_2=CHSiCl_2,$$
$$\underset{\underset{CH_3}{|}}{}$$

$$CH_2=C(CH_3)SiCl_3 \quad \text{or} \quad CH_2=C(CH_3)SiCl_2,$$
$$\underset{\underset{CH_3}{|}}{}$$

a compound represented by the general formula (III):

$$CH_2=\underset{\underset{R^2}{|}}{C}-COO(CH_2)_n\underset{\underset{R_a^1}{|}}{Si}-X_{3-a}^1 \quad (III)$$

wherein $R^1$, $R^2$, $X^1$ and a are as defined above, n is an integer of 1 to 12, such as $$CH_2=CHCOO(CH_2)_3SiCl_3,$$

$$CH_2=CHCOO(CH_2)_3SiCl_2,$$
$$\underset{\underset{CH_3}{|}}{}$$

$$CH_2=C(CH_3)COO(CH_2)_3SiCl_3 \quad \text{or}$$

$$CH_2=C(CH_3)COO(CH_2)_3SiCl_2.$$
$$\underset{\underset{CH_3}{|}}{}$$

a compound represented by the general formula (IV):

$$CH_2=\underset{\underset{R^2}{|}}{C}-\underset{\underset{R_a^1}{|}}{Si}-(OR^3)_{3-a} \quad (IV)$$

wherein $R^1$, $R^2$ and a are as defined above, $R^3$ is alkyl group having 1 to 16 carbon atoms, such as $$CH_2=CHSi(OCH_3)_3,$$

$$CH_2=CHSi(OCH_3)_2,$$
$$\underset{\underset{CH_3}{|}}{}$$

$$CH_2=C(CH_3)Si(OCH_3)_3,$$

$$CH_2=C(CH_3)Si(OCH_3)_2,$$
$$\underset{\underset{CH_3}{|}}{}$$

$$CH_2=CHSi(OC_2H_5)_3,$$

$$CH_2=CHSi(OC_2H_5)_2,$$
$$\underset{\underset{CH_3}{|}}{}$$

$$CH_2=CHSi(OC_3H_7)_3,$$
$$CH_2=CHSi(OC_4H_9)_3,$$
$$CH_2=CHSi(OC_6H_{13})_3,$$
$$CH_2=CHSi(OC_8H_{17})_3,$$

$$CH_2=CHSi(OC_{10}H_{21})_3 \quad \text{or}$$
$$CH_2=CHSi(OC_{12}H_{25})_3,$$

a compound represented by the general formula (V):

$$CH_2=\underset{\underset{R^2}{|}}{C}-COO(CH_2)_n\underset{\underset{R_a^1}{|}}{Si}-(OR^3)_{3-a} \quad (V)$$

wherein $R^1$, $R^2$, $R^3$, a and n are as defined above, such as $$CH_2=CHCOO(CH_2)_3Si(OCH_3)_3,$$

$$CH_2=CHCOO(CH_2)_3Si(OCH_3)_2,$$
$$\underset{\underset{CH_3}{|}}{}$$

$$CH_2=C(CH_3)COO(CH_2)_3Si(OCH_3)_3,$$

$$CH_2=C(CH_3)COO(CH_2)_3Si(OCH_3)_2,$$
$$\underset{\underset{CH_3}{|}}{}$$

$$CH_2=CHCOO(CH_2)_3Si(OC_2H_5)_3,$$

$$CH_2=CHCOO(CH_2)_3Si(OC_2H_5)_2,$$
$$\underset{\underset{CH_3}{|}}{}$$

$$CH_2=C(CH_3)COO(CH_2)_3Si(OC_2H_5)_3,$$

$$CH_2=C(CH_3)COO(CH_2)_3Si(OC_2H_5)_2 \quad \text{or}$$
$$\underset{\underset{CH_3}{|}}{}$$

$$CH_2=C(CH_3)COO(CH_2)_{11}Si(OCH_3)_3,$$

a compound represented by the general formula (VI):

$$CH_2=\underset{\underset{R^2}{|}}{C}-CH_2OCO-\underset{\phantom{x}}{\bigcirc}-COO(CH_2)_n\underset{\underset{R_a^1}{|}}{Si}-(OR^3)_{3-a} \quad (VI)$$

wherein $R^1$, $R^2$, $R^3$, a and n are as defined above, such as $$CH_2=CH-CH_2OCO(o\text{-}C_6H_4)COO(CH_2)_3Si(OCH_3)_3 \quad \text{or}$$

$$CH_2=CH-CH_2OCO(o\text{-}C_6H_4)COO(CH_2)_3Si(OCH_3)_2,$$
$$\underset{\underset{CH_3}{|}}{}$$

a compound represented by the general formula (VII):

$$CH_2=\underset{\underset{R^2}{|}}{C}-(CH_2)_n-\underset{\underset{R_a^1}{|}}{Si}-(OR^3)_{3-a} \quad (VII)$$

wherein $R^1$, $R^2$, $R^3$, a and n are as defined above, such as $$CH_2=CH(CH_2)_4Si(OCH_3)_3 \quad \text{or}$$

$$CH_2=CH(CH_2)_8Si(OCH_3)_3,$$

a compound represented by the general formula (VIII):

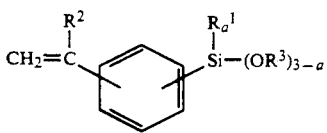

wherein $R^1$, $R^2$, $R^3$ and a are as defined above, such as $CH_2=CH-(p-C_6H_4)Si(OCH_3)_3$, $CH_2=CH-(p-C_6H_4)\overset{\underset{\displaystyle CH_3}{|}}{Si}(OCH_3)_2$, $CH_2=C(CH_3)-(p-C_6H_4)Si(OCH_3)_3$ or $CH_2=C(CH_3)-(p-C_6H_4)\overset{\underset{\displaystyle CH_3}{|}}{Si}(OCH_3)_2$, a compound represented by the general formula (IX):

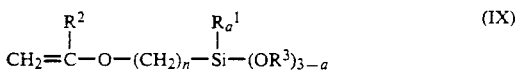 (IX)

wherein $R^1$, $R^2$, $R^3$, a and n are as defined above, such as $CH_2=CH-O-(CH_2)_3-Si(OCH_3)_3$ a compound represented by the general formula (X):

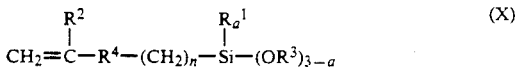 (X)

wherein $R^1$, $R^2$, $R^3$, a and n are as defined above, $R^4$ is —$CH_2O$— or —$CH_2OCO$—, such as $CH_2=CHCH_2O(CH_2)_3Si(OCH_3)_3$ or $CH_2=CHCH_2OCO(CH_2)_{10}Si(OCH_3)_3$.

and
a compound represented by the general formula (XI):

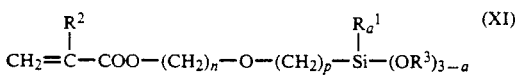 (XI)

wherein $R^1$, $R^2$, $R^3$, a and n are as defined above, p is an integer of 1 to 12, such as $CH_2=C(CH_3)COO(CH_2)_2O(CH_2)_3Si(OCH_3)_3$ or $CH_2=C(CH_3)COO(CH_2)_2O(CH_2)_3\overset{\underset{\displaystyle CH_3}{|}}{Si}(OCH_3)_2$.

Those compounds may be used alone or in admixture thereof. A compound having an alkoxysilyl group is the most preferable compound of the above compounds from the viewpoint of easiness of treatment, low cost and the fact that little by-products is generated.

Examples of the above-mentioned basic compound (B) are, for instance, an alkali metal hydroxide such as potassium hydroxide, sodium hydroxide, lithium hydroxide or rubidium hydroxide; an alkaline earth metal hydroxide such as magnesium hydroxide or calcium hydroxide; cerium hydroxide; a quaternary ammonium hydroxide such as tetramethylammonium hydroxide or benzyltrimethylammonium hydroxide, and a quaternary phosphonium hydroxide such as tetramethylphosphonium hydroxide. At least one compound selected from the above compounds can be used. Among them, potassium hydroxide, sodium hydroxide, lithium hydroxide, cerium hydroxide, rubidium hydroxide, a quaternary ammonium hydroxide and a quaternary phosphonium hydroxide are preferable from the viewpoint of reactivity.

With respect to the mixing ratio of the above-mentioned basic compound (B) with the above-mentioned monomer (A), it is preferable that the amount of the basic compound (B) is 0.5 to 2 equivalents, particularly 0.8 to 1.2 equivalents based on an equivalent of a —Si—X group in the silyl group represented by the general formula (I) of the monomer (A). When the amount of the basic compound (B) is less than 0.5 equivalent, the resulting reaction product (I) is apt to gelate during its synthesis or storage. When the amount of the basic compound (B) is more than 2 equivalents, water resistance of a film formed from the resulting aqueous composition is apt to deteriorate.

The processes for preparing the reaction product (I) are not particularly limited. One of the processes is as follows. The basic compound (B) is dissolved in an organic solvent such as methanol, ethanol or isopropanol or in water. The monomer (A) is slowly added thereto at 0° to 50° C., particularly 0° to 30° C., and if necessary, heated to 30° to 80° C., particularly 30° to 50° C. to give a reaction product. When the exothermic reaction ceases, the reaction is completed. The reaction product can be isolated. Otherwise, the reaction product prepared in water can be used as an aqueous solution for emulsion polymerization as it is.

The vinyl monomer (II) polymerizable with the above-mentioned reaction product (I) is not particularly limited. Examples of the vinyl monomer (II) are, for instance, a vinyl monomer such as methyl acrylate or methacrylate ((meth)acrylate, hereinafter referred to the same), ethyl (meth)acrylate, n-butyl (meth)acrylate, iso-butyl (meth)-acrylate, t-butyl (meth)acrylate, benzyl (meth)acrylate or cyclohexyl (meth)acrylate; a vinyl monomer having a hydrolizable silyl group such as vinyl trimethoxysilane, vinyl methyldimethoxysilane, 3-methacryloxypropyl trimethoxysilane or 3-methacryloxypropyl methyldimethoxysilane; a vinyl monomer having fluorine atom such as trifluoroethyl (meth)acrylate, pentafluoropropyl (meth)acrylate, perfluorocyclohexyl (meth)acrylate, 2,2,3,3-tetrafluoropropyl (meth)acrylate or β-(perfluorooctyl)ethyl (meth)acrylate; aromatic hydrocarbon monomer having a vinyl group such as styrene, α-methylstyrene, chlorostyrene or 4-hydroxylstyrene, vinyltoluene; α,β-ethylene unsaturated carbonic acid such as acrylic acid, methacrylic acid, maleic acid, maleic acid anhydride, itaconic acid, itaconic acid anhydride, crotonic acid, fumaric acid or citraconic acid; an acid having a polymerizable carbon-carbon double bond such as styrenesulfonic acid or vinylsulfonic acid or a salt thereof such as an alkali metal salt, an ammonium salt or an amine salt; an acid anhydride such as maleic acid or a half ester thereof with a straight or branched chain alcohol having 1 to 20 carbon atoms; a (meth)acrylate having an amino group such as dimethylaminoethyl (meth)acrylate, dimethylaminopropyl (meth)acrylate or diethylaminoethyl (meth)acrylate; (meth)acrylamide, α-ethyl (meth)acrylamide, N-butoxymethyl (meth)acrylamide, N,N-dimethylacrylamide, N-methylacrylamide or acryloylmorpholine, or a hydrochloride, an acetate thereof; a vinyl ester or an allyl compound such as vinyl acetate, vinyl propionate or diallyl phthalate; a vinyl monomer having nitrile group such as (meth)acrylonitrile; a vinyl monomer having epoxy group such as glycidyl (meth)acrylate; a vinyl monomer having hydroxyl group such as 2-hydroxyethyl (meth)acrylate, 2-hydroxypropyl (meth)acrylate, 2-hydroxyethylvinyl ether, N-methylol (meth)acrylamide, hydroxylstyrene, "Aronix 5700" commercially available from Toagosei Chemical Industry Co., Ltd., "Placcel FA-1", "Placcel FA-4", "Placcel FM-1" and "Placcel FM-4" commercially available from Daicel Chemical Industries, Ltd., "HE-10", "HE-20", "HP-10" and "HP-20" commercially available from NIPPON SHOKUBAI CO., LTD., "Blenmer PP series", "Blenmer PE series", "Blenmer PEP series", "Blenmer AP-400", "Blenmer AE-350", "Blenmer NKH-5050" and "Blenmer GLM" commercially available from Nippon Oil & Fats Co., Ltd., a vinyl monomer having hydroxyl group such as a vinyl denaturated hydroxyalkyl vinyl monomer having a hydroxyl group; a vinyl compound such as a phosphoric acid ester such as a hydroxyalkyl ester of α,β-ethylenic unsaturated carbonic acid such as hydroxyalkyl (meth)acrylate and phosphoric acid or phosphoric acid ester or a vinyl compound such as a (meth)acrylate having an urethane bond or a siloxane bond; the other vinyl monomer such as "AS-6", "AN-6", "AA-6", "AB-6" or "AK-5" which is a macro monomer commercially available from Toagosei Chemical Industry Co., Ltd., vinylmethyl ether, vinyl chloride, vinylidene chloride, chloroprene, propylene, butadiene, N-vinyl imidazole, vinylsulfonic acid, and the like; a polymerizable light stabilizer and a polymerizable ultraviolet absorber such as "LA 87", "LA 82" or "LA 22" commercially available from Asahi Denka Kogyo K. K.

The kind of the above-mentioned vinyl monomer (II) can be selected in accordance with the physical properties of the desired aqueous composition. For instance, it is preferable to use a vinyl monomer containing fluorine atom or a vinyl monomer containing siloxanyl group as the vinyl monomer (II) when water repellency is imparted to a film formed by using the aqueous composition to improve water resistance and durability. It is preferable to use a hydrophilic monomer such as a vinyl monomer having hydroxyl group, polypropylene glycol methacrylate or polyethylene glycol monomethacrylate in order to improve the stability of the aqueous composition. Also, when a hydrolyzable silyl group-containing vinyl monomer is used, water resistance of a formed film is improved. When an acidic vinyl monomer is used, curability of a formed film is improved.

Also, it is possible to obtain a polymer having a crosslinked structure by using a polymerizable monomer having at least two unsaturated double bonds such as polyethylene glycol dimethacrylate, ethylene glycol diacrylate or triallyl cyanurate as the above-mentioned vinyl monomer (II).

It is desired that the reaction product (I) and the vinyl monomer copolymerizable therewith are admixed to give an admixture of 1 to 30 parts by weight, preferably 2 to 25 parts by weight of the reaction product (I) and 70 to 99 parts by weight, preferably 75 to 98 parts by weight of the vinyl monomer (II) per 100 parts by weight of the total amount of the both. When the amount of the reaction product (I) is less than 1 part by weight, water resistance and weatherability of a formed film are apt to deteriorate. When the amount of the reaction product (I) is more than 30 parts by weight, water resistance of a film is lowered and stability of the aqueous composition is apt to be lowered.

The reaction product (I) is conducted to emulsion polymerization with the vinyl monomer (II) copolymerizable therewith.

Examples of the emulsion polymerization method are, for instance, batch polymerization, monomer-dropping polymerization, emulsion monomer-dropping polymerization and other various emulsion polymerizations. Among them, a suitable method can be selected and used. Especially, monomer-dropping polymerization and emulsion monomer-dropping polymerization are suitable because the stability of the emulsion can be improved. The above-mentioned reaction product (I) shows water solubility or water dispersability, and can improve the stability of the emulsion. Therefore, the reaction product (I) can be stably polymerized without any emulsifier.

When the emulsifier is used, the kind of the emulsifier is not particularly limited, provided that it is used in a conventional emulsion polymerization. Examples of the emulsifier are ionic and nonionic surfactants. Examples of the ionic surfactant are, for instance, sulfates such as sodium lauryl sulfate, sodium dodecylbenzene sulfate and sodium isooctylbenzene sulfate; anionic emulsifiers containing (poly)oxyethylene group such as Newcol-723SF, Newcol-707SN, Newcol-707SF, Newcol-740SF and Newcol-560SN commercially available from Nippon Nyukazai K. K.; ammonium salts such as imidaline laurate and ammonium hydrooxide; and the like. Examples of the nonionic surfactant are, for instance, polyethylene glycol nonylphenyl ether; polyoxyethylenes such as polyoxyethylene nonylphenyl ether and polyoxyethylene lauryl ether; nonionic emulsifiers containing silicone such as L-77, L-720, L-5410, L-7602 and L-7607 commercially available from UNION CARBIDE, and the like. Also, as an emulsifier, a reactive emulsifier having a polymerizable double bond in its molecule can be used. Especially, when a reactive emulsifier having polyoxyethylene group in its molecule is used, water resistance of a formed film is improved. Examples of such emulsifier are, for instance, Adekareasoap NE-10, NE-20, NE-30, NE-40 and SE-10N commercially available from Asahi Denka Kogyo K. K., Antox-MS-60 commercially available from Nippon Nyukazai K. K., Aqualon RN-20, RN-30, RN-50, HS-10, HS-20 and HS-1025 commercially available from DAI-ICHI KOGYO SEIYAKU CO. LTD., and the like. It is desired that the amount of the emulsifier is 0 to 10 parts by weight, preferably 0.5 to 8 parts by weight per 100 parts by weight of the total amount of the reaction product (I) and the vinyl monomer (II). When the amount of the emulsifier is more than 10 parts, water resistance of a formed film is apt to be lowered.

The reaction product (I) stably exists in water. However, in order to stably carry out the polymerization of the reaction product (I) with the vinyl monomer (II), a redox catalyst can be used as a polymerization initiator. Also, it is desired that the reaction temperature is not more than 70° C., preferably from 40° to 65° C., and pH is from 5 to 10 to make sure the stability of the mixture during the polymerization and stably carry out the polymerization.

Examples of the redox catalyst are, for instance, the combination of potassium persulfate or ammonium persulfate, and acidic sodium sulfite or Rongalit; the combination of hydrogen peroxide and ascorbic acid; the combination of organic peroxide such as t-butyl hydroperoxide, benzoyl peroxide or cumene hydroperoxide, and acidic sodium sulfite, Rongalit, and the like. Especially, the combination of a persulfate and a reducing agent is preferable from the viewpoint that the polymerization can be stably carried out.

It is desired that the amount of the polymerization initiator is 0.01 to 10 parts by weight, preferably 0.05 to 5 parts by weight per 100 parts by weight of the vinyl monomer (II). When the amount of the polymerization initiator is less than 0.01 part by weight, there is a tendency that the polymerization is not smoothly proceeded. When the amount of the polymerization initiator is more than 10 parts by weight, the molecular weight of an obtained polymer is lowered, and durability of a formed film is apt to be lowered.

In order to stabilize the catalytic activity of the polymerization initiator, a compound containing divalent iron ion such as iron sulfate and a chelating agent such as sodium ethylenediamine tetraacetate may be used. It is desired that the amount of the chelating agent is 0.001 to 1 part by weight, preferably 0.005 to 0.5 part by weight per 100 parts by weight of the vinyl monomer (II).

It is desired that the concentration of solid matter in the aqueous composition obtained by the emulsion polymerization is adjusted to 20 to 70 parts by weight, preferably 30 to 60 parts by weight per 100 parts by weight of the aqueous composition. When the concentration of solid matter is more than 70 parts by weight, by the reason that the concentration of the reaction system remarkably raises, it becomes more difficult to remove exothermic heat accompanied by the polymerization reaction, or it comes to take a long period of time to take out the aqueous composition from a polymerization reactor. On the other hand, when the concentration of solid matter is less than 20 parts by weight, the amount of the resin obtained is decreased and it becomes economically disadvantageous, although no problem is caused in the polymerization procedure. Furthermore, because thickness of a film becomes thin during the forming of a film, physical properties of the film are often deteriorated, and the coating workability becomes disadvantageous. The concentration of the aqueous composition can be adjusted by adding deionized water thereto to be within the above-mentioned concentration range.

The emulsion-polymerized copolymer in the aqueous composition of the present invention is made up of superfine particles having an average particle diameter of about 0.02 to about 1.0 μm. Therefore, the emulsion-polymerized copolymer shows excellent film formability. Furthermore, the aqueous composition can form a stable film because silyl group contained therein forms a crosslinking by siloxane bond when the aqueous composition is coated on a material to be coated and then dried at ambient temperature.

If necessary, a co-solvent can be added to the aqueous composition to improve film formability.

Examples of the co-solvent are, for instance, alcohol solvent having a straight- or branched-chain alkyl group having 1 to 10 carbon atoms, (poly)ethylene glycol monoalkyl ether represented by the formula:

$$H-(OCH_2CH_2)_m-OR^5$$

wherein $R^5$ is a straight- or branched-chain alkyl group having 1 to 10 carbon atoms and m is an integer of 1 to 5, (poly)ethylene glycol alkyl ether ester represented by the formula:

$$R^6-CO-(O-CH_2CH_2)_m-OR^5$$

wherein $R^5$ and m are as defined above, and $R^6$ is a straight- or branched-chain alkyl group having 1 to 10 carbon atoms, (poly)propylene glycol monoalkyl ether represented by the formula (XII):

$$H-(O-CH_2\underset{\underset{CH_3}{|}}{C}H)_m-OR^5 \qquad (XII)$$

wherein $R^5$ and m are as defined above, (poly)propylene glycol alkyl ether ester represented by the formula (XIII):

$$R^6CO\!\!+\!\!O-CH_2\underset{\underset{CH_3}{|}}{C}H)_m-OR^5 \qquad (XIII)$$

wherein $R^5$, $R^6$ and m are as defined above, and the like.

Examples of the co-solvent are, for instance, alcohols such as methyl alcohol, ethyl alcohol, n-propyl alcohol, isopropyl alcohol, n-butyl alcohol, isobutyl alcohol, hexyl alcohol, octyl alcohol and 2,2,4-trimethyl-1,3-pentanediol monoisobutylate; ethers such as methyl cellosolve, ethyl cellosolve, butyl cellosolve, diethylene glycol monoethyl ether, diethylene glycol monobutyl ether, propylene glycol monoethyl ether, propylene glycol monobutyl ether, propylene glycol monoisobutyl ether, dipropylene glycol monoethyl ether, dipropylene glycol monobutyl ether, dipropylene glycol monoisobutyl ether, tripropylene glycol monoethyl ether, tripropylene glycol monobutyl ether and tripropylene glycol monoisobutyl ether; glycol ether esters such as butyl cellosolve acetate, diethylene glycol monobutyl ether acetate, dipropylene glycol monobutyl ether acetate, tripropylene glycol monobutyl ether acetate, tripropylene glycol monoisobutyl ether acetate; and the like. The co-solvent is used alone or in admixture thereof.

The co-solvent may be added during the emulsion polymerization, or after the emulsion polymerization.

It is desired that the amount of the co-solvent is 0.1 to 15 parts by weight, preferably 0.5 to 10 parts by weight per 100 parts by weight of the aqueous composition. When the amount of the co-solvent is less than 0.1 part by weight, there is a tendency that film formability is lowered. When the amount of the co-solvent is more than 15 parts by weight, there is a tendency that durability and stain resistance of a formed film are lowered.

The aqueous composition of the present invention is cured by carbon dioxide exsisting in air. However, as occasion demands, a curing catalyst may be used in order to accelerate curing and obtain desired physical properties.

The reaction product obtained by reacting the monomer (A) with the basic compound (B) is crosslinked at ambient temperature in the presence of a conventional curing catalyst such as an alkali silicate such as water glass.

Examples of the curing catalyst are, for instance, carbon dioxide; ammonium carbonate; carbonates such as dimethyl carbonate and diethyl carbonate; hydrogencarbonates such as ammonium hydrogencarbonate, potassium hydrogencarbonate, sodium hydrogencarbonate, magnesium hydrogencarbonate and lithium hydrogencarbonate; organic acidic compounds such as maleic acid, adipic acid, azelaic acid, sebacic acid, itaconic acid, citric acid, succinic acid, trimellitic acid, pyromellitic acid and its anhydride; sulfonic acids such as sulfuric acid and p-toluenesulfonic acid; sulfate esters such as dimethyl sulfate and diethyl sulfate; hydrogensulfates such as ammonium hydrogensulfate, potassium hydrogensulfate, cesium hydrogensulfate, sodium hydrogensulfate and lithium hydrogensulfate; hydrochloric acid; phosphoric acid; phosphates such as zirconium phosphate, aluminium phosphate and (poly)sodium phosphate; sodium silicofluoride; zinc oxide; triacetin, diacetin, glyoxal, and the like. The curing catalyst is used alone or in admixture thereof.

Among the curing catalysts, carbon dioxide, carbonates, hydrogencarbonates, organic acidic compounds, sulfonic acids containing sulfuric acid, sulfate esters, hydrogensulfates, phosphoric acid, phosphates, sodium silicofluoride, zinc oxide, triacetin, diacetin and glyoxal are preferable from the viewpoint of their high curing activity. Furthermore, carbon dioxide, hydrogencarbonates, organic acidic compounds, sulfuric acid and hydrogensulfates are more preferable.

The amount of the curing catalyst is not particularly limited. However, it is desired that the amount of the curing catalyst is usually 0.01 to 20 parts by weight, preferably 0.1 to 10 parts by weight per 100 parts by weight of solid matter of the aqueous composition. When the amount of the curing catalyst is more than 20 parts by weight, gloss of a film deteriorates and appearance is lowered. When, the amount of the curing catalyst is less than 0.01 part by weight, there is a tendency that curability of the composition is lowered.

In case of using a hydrolyzable silyl group-containing vinyl monomer (II), it is preferable to use a condensation catalyst in order to improve water resistance and weatherability of a film.

Examples of the condensation catalyst are, for instance, organic tin compounds such as dioctyltin maleate and dibutyltin dilaurate, phosphites, and the like.

It is desired that the amount of the condensation catalyst is 0.1 to 20 parts by weight, preferably 0.2 to 5 parts by weight per 100 parts by weight of solid matter of the aqueous composition. When the amount of the condensation catalyst is less than 0.1 part by weight, there is a tendency that curing rate is lowered. On the other hand, when the amount of the condensation catalyst is more than 20 parts by weight, there is a tendency that appearance and water resistance of a film are lowered.

In the present invention, to the above-mentioned aqueous composition can be added additives which are conventionally used in paints, such as pigments including white pigment (titanium dioxide, calcium carbonate, barium carbonate, kaolin or the like) and another colored pigment (carbon black, red iron oxide, cyanine blue or the like), colloidal silica, a plasticizer, a solvent, a dispersant, a thickener, a defoaming agent, a preserving agent and an ultraviolet absorber.

Furthermore, a commercially available aqueous paint can be mixed with the aqueous composition. Examples of the aqueous paint are, for instance, thermosetting acrylic paints such as an acrylic paint and an acrylic melamine paint, alkyd paints, epoxy paints, fluorocarbon resin paints and the like. In case of mixing these paints with the aqueous composition, weatherability, acid resistance, solvent resistance and the like can be improved. Also, the aqueous composition can be used for the uses such as an adhesive and a pressure sensitive adhesive by using an additive such as a thickener.

To the aqueous composition of the invention can be added, for instance, a melamine resin, an isocyanate compound or the like as an crosslinking agent to provide rapid curability and the like.

The aqueous composition of the present invention can be suitably used as agents for surface treatment as well as paints such as paints for inner and outer walls of buildings, paints for automobiles (e.g. clear which is coated on a metallic base for repairing), paints for directly coating a metal such as aluminum or stainless steel and paints for directly coating ceramics base materials such as slate, concrete and tiles.

The present invention is more specifically described and explained by means of the following Preparation Examples, Examples and Comparative Examples in which all parts are by weight unless otherwise noted. It is to be understood that the present invention is not limited to the Examples and various changes and modifications may be made in the present invention without departing from the spirit and scope thereof.

PREPARATION EXAMPLE 1

Synthesis of reaction product (I)

A reactor equipped with a stirrer, a thermometer, a reflux condenser and a dropping funnel was charged with 22 parts of deionized water, and cooled to 0° C. with ice-cold water. Thereto was slowly added 31.5 parts of potassium hydroxide to dissolve it therein. To thus obtained aqueous solution was added dropwise over 1 hour 28 parts of vinyltrimethoxysilane. Then, reaction was carried out for 1 hour to give a reaction product (hereinafter referred to as "Reaction product (I -1)").

PREPARATION EXAMPLE 2

Synthesis of reaction product (I)

In the same manner as described in Preparation Example 1, except that 22 parts as the amount of deionized water was changed to 28 parts, 31.5 parts as the amount of potassium hydroxide was changed to 38 parts, and 28 parts of vinyltrimethoxysilane was changed to 45 parts of vinylmethyldimethoxysilane, reaction was carried out to give a reaction product (hereinafter referred to as "Reaction product (I -2)").

EXAMPLES 1 TO 7 AND COMPARATIVE EXAMPLES 1 TO 2

Synthesis of aqueous composition

A reactor equipped with a stirrer, a thermometer, a reflux condenser, a nitrogen inlet tube and a dropping funnel was charged with 100 parts of deionized water and 3 parts of sodium dodecylbenzene sulfate as an emulsifier (in Example 4, Adekareasoap SE-10N was used instead of sodium dodecylbenzene sulfate) and 1 part of polyethylene glycol nonylphenyl ether. Thereto were added 0.2 part of sodium hydrogensulfite and 0.5 part of ammonium persulfate. Then, the reactor was heated to 60° C. with introducing nitrogen gas. successively, the mixture shown in Table 1 was added dropwise at a uniform velocity over 3 hours thereto through a dropping funnel.

beginning and after storage for 1 month in an atmosphere of 50° C.

TABLE 1

| Ex. No. | Composition of components (parts(s)) | | | Result of polymerization |
|---|---|---|---|---|
| | Reaction product (I) | | Vinyl monomer (II) | |
| 1 | Reaction product | (I-1) (25) | n-Butyl acrylate (30) Methyl methacrylate (40) n-Butyl methacrylate (15) | ○ |
| 2 | Reaction product | (I-1) (25) | n-Butyl acrylate (30) Methyl methacrylate (40) n-Butyl methacrylate (14) Acrylic acid (1) | ○ |
| 3 | Reaction product | (I-1) (25) | n-Butyl acrylate (30) Methyl methacrylate (40) n-Butyl methacrylate (12) γ-Methacryloxypropyl-trimethoxysilane (3) | ○ |
| 4 | Reaction product | (I-1) (25) | n-Butyl acrylate (30) Methyl methacrylate (40) n-Butyl methacrylate (15) | ○ |
| 5 | Reaction product | (I-2) (25) | n-Butyl acrylate (30) Methyl methacrylate (40) n-Butyl methacrylate (15) | ○ |
| 6 | Reaction product | (I-2) (10) | n-Butyl acrylate (30) Methyl methacrylate (40) n-Butyl methacrylate (15) | ○ |
| 7 | Reaction product | (I-2) (3) | n-Butyl acrylate (30) Methyl methacrylate (40) n-Butyl methacrylate (15) | ○ |
| Com. Ex. | | | | |
| 1 | — | | n-Butyl acrylate (30) Methyl methacrylate (40) n-Butyl methacrylate (15) γ-Methacryloxypropyl-trimethoxysilane (15) | X |
| 2 | — | | n-Butyl acrylate (30) Methyl methacrylate (40) n-Butyl methacrylate (30) | ○ |

The results of polymerization of the obtained composition were examined according to the following methods, and are shown in Table 1.

Result of polymerization

Presence of gelatin was oberved with a naked eye on the basis of occurrence of aggregation and setting of resin particles. The results were evaluated in accordance with the following criterion.

Criterion

○: Emulsified
X: Gelated

The composition obtained in Comparative Example 1 was gelated during polymerization. However, the compositions obtained in Examples 1 to 7 and Comparative Example 2 were not gelated.

Successively, each composition was aged at 60° C. for 2 hours, and then cooled. Deionized water was added to the composition so that the amount of solid matter of the composition was adjusted to 40 parts per 100 parts of the composition to give an aqueous composition.

As a co-solvent, 5 parts of 2,2,4-trimethyl-1,3-pentanediol monoisobutylate was added to 100 parts of thus obtained aqueous composition. Then, storage stability was examined according to the following method. The results are shown in Table 2.

Storage stability

Viscosity of the obtained composition was measured by means of Brook-field type viscometer (23° C.) at the beginning and after storage for 1 month in an atmosphere of 50° C.

Then, 5 parts of 2,2,4-trimethyl-1,3-pentanediol monoisobutylate was added to 100 parts of the obtained aqueous composition and coated on a polyethylene sheet or a slate panel on which an epoxy primer was coated so that the thickness of a film became 50 μm. In an atmosphere containing 5% carbon dioxide, thus obtained material was dried and cured at ambient temperature for 15 days to give test pieces.

As physical properties of the formed film, curability, water resistance, acid resistance and alkali resistance were examined in accordance with the following methods. The results are shown in Table 2.

Curability

Dried film removed from the polyethylene sheet was immersed in acetone for 1 day. Residual rate of the film after immersing in acetone is shown as gel fraction in Table 2.

Water resistance

The test piece was immersed in warm water having 50° C. for 1 month. Then, gloss of the film was measured by means of a glossmeter (60 light) and shown as gloss retention.

Acid resistance

On the dried film of the test piece was spotted 5% aqueous solution of sulfuric acid. One week later, the condition of the surface of the film was observed with a naked eye. Acid resistance of the film was evaluated according to the following criterion.

Criterion

○: No change
Δ: A little change
X: Considerable change

Alkali resistance

On the dried film of the test piece, 5% aqueous solution of sodium hydroxide was spotted. One week later, the condition of the surface of the film was observed with a naked eye. Alkali resistance of the film was evaluated according to the following criterion.

Criterion

○: No change
Γ: A little change
X: Considerable change

TABLE 2

| | Storage stability (cp) | | Curability (Gel fraction (%)) | Water resistance (Gloss retention (%)) | Acid resistance | Alkali resistance |
|---|---|---|---|---|---|---|
| | Beginning | After storage | | | | |
| Ex. No. | | | | | | |
| 1 | 20 | 25 | 92 | 87 | ○ | ○ |
| 2 | 24 | 30 | 97 | 93 | ○ | ○ |
| 3 | 22 | 26 | 99 | 98 | ○ | ○ |
| 4 | 22 | 24 | 93 | 94 | ○ | ○ |
| 5 | 20 | 24 | 90 | 90 | ○ | ○ |
| 6 | 21 | 25 | 90 | 88 | ○ | ○ |
| 7 | 22 | 23 | 87 | 86 | ○ | ○ |
| Com. Ex. | | | | | | |
| 1 | — | — | — | — | | |
| 2 | 20 | 24 | 0 | 20 | X | X |

As is clear from the results shown in Tables 1 and 2, the aqueous compositions obtained in Examples 1 to 7 maintain excellent storage stability, and excellent polymerization stability. Furthermore, the film formed by the aqueous composition is excellent in curability, water resistance, acid resistance and alkali resistance.

In addition to the ingredients used in Examples, other ingredients can be used in the Examples as set forth in the specification to obtain substantially the same results.

What we claim is:

1. A room temperature cross-linkable aqueous composition which contains an emulsion-polymerized copolymer comprising (I) a reaction product prepared by reacting (A) a monomer having at least one polymerizable double bond and a silyl group represented by the general formula (I):

wherein $R^1$ is a monovalent hydrocarbon group selected from the group consisting of alkyl group having 1 to 10 carbon atoms, aryl group and aralkyl group, X is a halogen atom, alkoxy group, hydroxyl group, acyloxy group, aminoxy group, phenoxy group, thioalkoxy group or amino group, a is 0, 1 or 2, when the number of each of X and $R^1$ which is bonded to the a Si atom is 2 or more, those X and $R^1$ may be either the same groups or the different groups respectively, and (B) a basic compound; and (II) a vinyl monomer copolymerizable with said (I) reaction product.

2. The room temperature cross-linkable aqueous composition of claim 1, wherein said basic compound (B) is at least one compound selected from the group consisting of potassium hydroxide, sodium hydroxide, lithium hydroxide, cerium hydroxide, rubidium hydroxide, quaternary anmonium hydroxide and quaternary phosphonium hydroxide.

3. The room temperature cross-linkable aqueous composition of claim 1 which contains at least one of a curing catalyst and a co-solvent.

* * * * *